United States Patent
Sato et al.

(10) Patent No.: US 7,866,806 B2
(45) Date of Patent: *Jan. 11, 2011

(54) LIQUID-COMPOSITION SET, AND LIQUID-APPLYING METHOD AND LIQUID-APPLYING APPARATUS EMPLOYING THE SET

(75) Inventors: Koichi Sato, Atsugi (JP); Ikuo Nakazawa, Zama (JP); Sakae Suda, Sagamihara (JP); Masayuki Ikegami, Atsugi (JP); Keiichiro Tsubaki, Kawasaki (JP); Ryuji Higashi, Atsugi (JP); Keiko Yamagishi, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 407 days.

This patent is subject to a terminal disclaimer.

(21) Appl. No.: 10/537,788

(22) PCT Filed: May 25, 2004

(86) PCT No.: PCT/JP2004/007467

§ 371 (c)(1), (2), (4) Date: Jun. 6, 2005

(87) PCT Pub. No.: WO2004/106440

PCT Pub. Date: Dec. 9, 2004

(65) Prior Publication Data

US 2006/0146087 A1    Jul. 6, 2006

(30) Foreign Application Priority Data

May 27, 2003 (JP) .............................. 2003-149419
Mar. 5, 2004 (JP) .............................. 2004-062967
May 17, 2004 (JP) .............................. 2004-146884

(51) Int. Cl.
    *C09D 11/00* (2006.01)
(52) U.S. Cl. ..................................... 347/100; 106/31.13
(58) Field of Classification Search ................. 347/100; 106/31.13
    See application file for complete search history.

(56) References Cited

U.S. PATENT DOCUMENTS 4,313,124 A    1/1982    Hara .................... 346/140 R (Continued)

FOREIGN PATENT DOCUMENTS

EP    0 952 196 A1    10/1999

(Continued)

OTHER PUBLICATIONS

Aoshima et al., "Living Cationic Polymerizatin of Vinyl Monomers by Organoaluminium Halides," Polymer Bulletin 15, 417-423, 1986.

*Primary Examiner*—Laura E Martin
(74) *Attorney, Agent, or Firm*—Fitzpatrick, Cella, Harper & Scinto

(57) ABSTRACT

A novel liquid composition set is provided for forming an image or pattern by functional substances such as a colorant without causing blurring. Each of the liquid compositions of the set includes a functional substance, an amphiphilic block copolyrner or graft copolymer having an organic acid group, and a liquid medium, wherein the organic acid groups of the copolymers are different in pKa, and the amphiphilic polymer contained in the first liquid composition becomes viscous by pH change on contact with the second liquid composition different in pH from the first liquid composition.

8 Claims, 1 Drawing Sheet

U.S. PATENT DOCUMENTS

| | | | | |
|---|---|---|---|---|
| 4,345,262 | A | 8/1982 | Shirato et al. | 346/140 R |
| 4,459,600 | A | 7/1984 | Sato et al. | 346/140 R |
| 4,463,359 | A | 7/1984 | Ayata et al. | 346/1.1 |
| 4,558,333 | A | 12/1985 | Sugitani et al. | 346/140 R |
| 4,723,129 | A | 2/1988 | Endo et al. | 346/1.1 |
| 4,740,796 | A | 4/1988 | Endo et al. | 346/1.1 |
| 5,181,045 | A | 1/1993 | Shields et al. | 346/1.1 |
| 5,320,668 | A | 6/1994 | Shields et al. | 106/20 R |
| 5,399,296 | A * | 3/1995 | Wierenga et al. | 510/535 |
| 5,626,654 | A * | 5/1997 | Breton et al. | 106/31.33 |
| 5,990,227 | A * | 11/1999 | Takizawa et al. | 524/517 |
| 6,247,808 | B1 * | 6/2001 | Ma et al. | 347/100 |
| 6,281,267 | B2 | 8/2001 | Parazak | 523/160 |
| 6,300,391 | B2 | 10/2001 | Parazak et al. | 523/160 |
| 6,511,534 | B1 * | 1/2003 | Mishina et al. | 106/31.33 |
| 7,538,147 | B2 * | 5/2009 | Sato et al. | 523/160 |
| 2003/0070581 | A1 * | 4/2003 | Tomioka et al. | 106/31.33 |
| 2003/0097961 | A1 * | 5/2003 | Yatake et al. | 106/31.59 |

FOREIGN PATENT DOCUMENTS

| | | |
|---|---|---|
| EP | 1 201 719 A1 | 5/2002 |
| EP | 1 243 624 A1 | 9/2002 |
| EP | 1243624 A1 * | 9/2002 |
| EP | 1 245 396 A2 | 10/2002 |
| JP | 59-123670 | 7/1984 |
| JP | 59-138461 | 8/1984 |
| JP | 5-208548 | 8/1993 |
| JP | 11-322866 | 11/1999 |
| JP | 11-322942 | 11/1999 |
| JP | 2000-129184 | 5/2000 |
| WO | WO 0194482 A1 * | 12/2001 |

* cited by examiner

LIQUID-COMPOSITION SET, AND LIQUID-APPLYING METHOD AND LIQUID-APPLYING APPARATUS EMPLOYING THE SET

TECHNICAL FIELD

The present invention relates to a liquid-applying method for fixing functional substances surely without diffusion between the substance fixation regions on an application medium, and relates also to a set of liquid compositions and a liquid-applying apparatus for the liquid-applying method.

BACKGROUND ART

Aqueous dispersion materials containing a functional substance are well known as functional materials, the functional materials including pesticides such as herbicides, and insecticides; medicines such as carcinogenic agents, antiallergic agents, and antiphlogistic agents; and coloring materials such as inks and toners containing a colorant. In recent years, digital printing techniques are progressing remarkably. The digital printing technique is typified by electrophotgraphy and ink-jet printing, and is becoming more and more important as image-forming techniques in offices and families.

Among these techniques, the ink-jet technique has advantages of compactness and less power consumption of the apparatus for direct recording, and the technique is progressing rapidly in image quality by use of finer nozzles and other improvement. In an example of the ink-jet techniques, an ink supplied from an ink tank is heated by a heater in a nozzle to evaporate and bubble, whereby the ink is ejected onto a recording medium to form an image. In another example of the ink-jet techniques, ink is ejected through a nozzle by oscillation of a piezoelectric element.

The inks used in ink-jet techniques are usually aqueous dye solutions. The aqueous dye solutions tend to cause ink bleeding on overlap of colors, or ink feathering along paper fibers at recorded positions on the recording medium. The coloring materials containing a colorant mainly composed of a dye are required to have improved weatherability. For the improvement thereof, Japanese Patent Application Laid-Open No. 5-208548 employs a reactive dye ink. U.S. Pat. No. 5,320,668 utilizes reaction of a reactive pigment and a dye. Japanese Patent Application Laid-Open No. 2000-129184 employs a reactive self-dispersing pigment. However, further improvements are waited for.

SUMMARY OF THE INVENTION

The present invention has been made on the aforementioned background. The present invention provides a set of liquid compositions which is useful in formation of an image on a recording medium by using functional substance-containing liquid compositions by sure fixation of the functional substances without blurring between the fixation regions.

The present invention provides also a method of applying a liquid by employing the above liquid-composition set to form an image on a recording medium without diffusion of the functional substances to retard blurring between the fixation regions.

The present invention further provides a liquid applying apparatus for image formation by use of the aforementioned liquid composition set without causing running of the functional substances between the fixation regions.

A first embodiment of the present invention is a set of a first liquid composition and a second composition for printing, each of the liquid compositions comprising a functional substance, an amphiphilic block copolymer or graft copolymer having an organic acid group, and a liquid medium, wherein the organic acid groups of the copolymers are different in pKa, and the amphiphilic copolymer contained in the first liquid composition becomes viscous by pH change on contact with the second liquid composition different in pH from the first liquid composition.

A second embodiment of the present invention is a method for liquid application, comprising a step of bringing the set of the liquid compositions of the first embodiment.

A third embodiment of the present invention is an apparatus for liquid application, comprising a liquid applying means for applying the set of compositions of the first embodiment onto a medium by energizing the respective liquid compositions to bring the liquid compositions into contact on the medium, and a driving means for driving the liquid applying means.

The set of the liquid compositions of the present invention enables efficient fixation of functional substances to form colored regions on a recording medium, and enables retardation of undesired mixing of the functional substances to prevent blur at the boundary between colored regions obtained by different liquid compositions.

The present invention provides a set of functional substance-containing liquid compositions which gives high fixability of the functional substances on formation of an image without blurring between the fixation regions of the functional substances.

The present invention also provides a liquid applying method for forming an image on a recording medium by use of the aforementioned liquid composition set without diffusion of the functional substances at the boundary between the fixation regions of the functional substances without causing blur.

The present invention further provides a liquid applying apparatus for image formation by use of the aforementioned liquid composition set without causing blur between fixation regions of the functional substances.

BEST MODES FOR CARRYING OUT THE INVENTION

Figure 1:
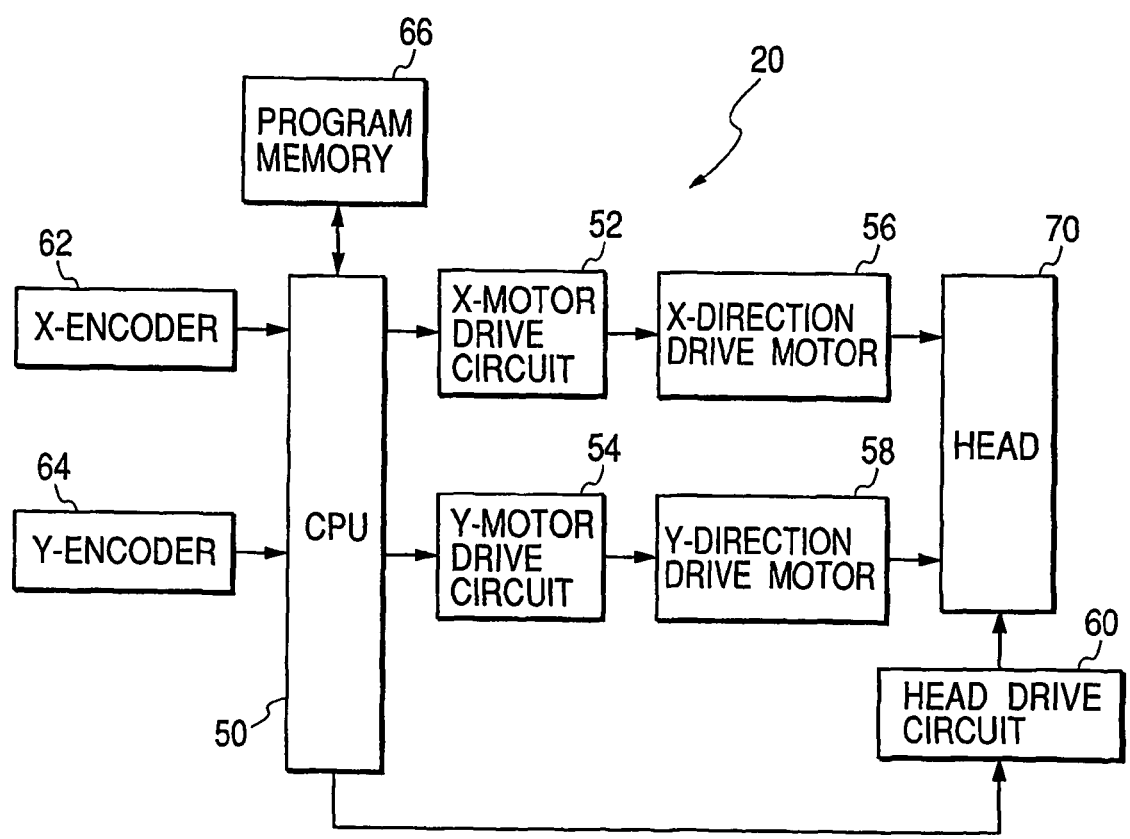
FIG. 1 is a block diagram showing constitution of the ink-jet recording apparatus.

The present invention is described below in detail.

The liquid-composition set of the present invention comprises a combination of two liquid compositions which causes viscosity increase of at least one of the liquid compositions on contact of the two liquid compositions at the contact portion. The liquid-composition set of the present invention may comprise a combination of more than two liquid compositions. For example, in a set comprising three liquid compositions, a first liquid composition and a second liquid composition satisfy the above conditions, and the second composition and a third composition satisfy the above conditions.

The respective liquid compositions are constituted of a functional substance, an amphiphilic polymer, and a liquid medium.

The functional substance in the present invention is a compound or composition performing an intended function. The functional substance includes pesticides such as herbicides, and insecticides; medicines such as carcinogenic agents, antiallergic agents, and antiphlogistic agents; and colorants such as pigments and dyes. In the above pesticides, the functional substance is an active compound showing herbicidal activity, or an active compound showing insecticidal activity. In the above medicines, the functional substance is a compound which mitigates or remits an objective symptom. According to the present invention, the functional substance is delivered to the intended site with improved fixability or site selectivity to facilitate the performance of the function. The present invention is particularly effective with a colorant as the functional substance. The colorant includes particulate solid matters like pigments, and dye compounds.

The pigments as examples of the colorant include inorganic colorless pigments, inorganic pale pigments, organic and inorganic color pigments, including also organic colorless or pale pigments, and metal-luster pigments. A pigment may be used which is synthesized newly for use in the present invention.

Commercial pigments of black, cyan, magenta, and yellow are shown below as examples.

The black pigments include Raven 1060 (Columbian Carbon Co.), MOGUL-L (Cabot Co.), Color Black FW1 (Degussa Co.), and MA 100 (Mitsubishi Chemical Co.), but are not limited thereto.

The cyan pigments include C.I. Pigment Blue-15:3, C.I. Pigment Blue-15:4, and C.I. Pigment Blue-16, but are not limited thereto.

The magenta pigments include C.I. Pigment Red-122, C.I. Pigment Red-123, and C.I. Pigment Red-146, but are not limited thereto.

The yellow pigments include C.I. Pigment Yellow-74, C.I. Pigment Yellow-128, and C.I. Pigment Yellow 129, but are not limited thereto.

In the present invention, a dye may be used similarly as the pigment. The dye may be a conventional one, or may be a novel one, including water-soluble dyes such as direct dyes, acid dyes, basic dyes, reactive dyes, and foodstuff dyes; fat-soluble (oil-soluble) dyes; and insoluble dyes such as disperse dyes. The dye may be used in a solid state. In this respect, an oil-soluble dye is preferably used.

The water-soluble dyes include:
direct dyes such as C.I. Direct Black-17, -62, -154; C.I. Direct Yellow-12, -87, -142; C.I. Direct Red-1, -62, -243;C.I. Direct Blue-6, -78, -199; C.I. Direct Orange-34, -60; C.I. Direct Violet-47, -48; C.I. Direct Brown-109; and C.I. Direct Green-59,
acid dyes such as C.I. Acid Black-2, -52, -208; C.I. Acid Yellow-11, -29, -71; C.I. Acid Red-1, -52, -317; C.I. Acid Blue-9, -93, -254; C.I. Acid Orange-7, -19; and C.I. Acid Violet-49,
reactive dyes such as C.I. Reactive Black-1, -23, -39; C.I. Reactive Yellow -2, -77, -163; C.I. Reactive Red-3, -111, -221; C.I. Reactive blue-2, -101, -217; C.I. Reactive Orange-5, -74, -99; C.I. Reactive Violet-1, -24, -38; C.I. Reactive Green-5, -15, -23; and C.I. Reactive Brown-2, -18, -33,
basic dyes such as C.I. Basic Black-2; C.I. Basic Red-1, -12, -27; C.I. Basic Blue-1, -24; C.I. Basic Violet-7, -14, -27, and
C.I. Food Black-1, -2.

The oil-soluble dyes include commercial color products below.

The black oil-soluble dyes include C.I. Solvent Black-3, -22:1, -50, but are not limited thereto.

The yellow oil-soluble dyes include C.I. Solvent Yellow-1, -25:1, -172, but are not limited thereto.

The orange oil-soluble dyes include C.I. Solvent Orange-1, -40:1, -99, but are not limited thereto.

The red oil-soluble dyes include C.I. Solvent Red-1, -111, -229, but are not limited thereto.

The violet oil-soluble dyes include C.I. Solvent Violet-2, -11, -47, but are not limited thereto.

The blue oil-soluble dyes include C.I. Solvent Blue-2, -43, -134, but are not limited thereto.

The green oil-soluble dyes include C.I. Solvent Green-1, -20, -33, but are not limited thereto.

The brown oil-soluble dyes include C.I. Solvent brown-1, -12, -58, but are not limited thereto.

The functional substance is contained in the liquid composition at a concentration ranging preferably from 0.01 to 80 mass % based on the total mass of the liquid composition. When two or more functional substances are contained in the liquid composition, the total amount thereof is kept preferably within this range. At a content lower than 0.01 mass %, the functional substance tends to serve insufficiently. At a content higher than 80 mass %, the dispersibility tends to be lower. The concentration is more preferably in the range from 0.1 to 50 mass %, still more preferably from 0.3 to 30 mass %.

The liquid composition of the present invention contains a liquid medium. The liquid medium contained in the liquid composition of the present invention is not limited, provided that it is capable of dissolving, suspending, or dispersing the components contained in the liquid composition. The useful liquid mediums in the present invention include water-soluble organic solvents; water-insoluble organic solvent such as linear, branched, or cyclic aliphatic hydrocarbons, aromatic hydrocarbons, and heterocyclic aromatic hydrocarbons; and water. Naturally mixed solvents thereof are also useful.

For the liquid composition of the present invention, useful are water, and aqueous liquid medium composed of water and a water-soluble organic solvent. The water-soluble organic solvent includes polyhydric alcohols such as ethylene glycol, diethylene glycol, triethylene glycol, polyethylene glycol, propylene glycol, polypropylene glycol, and glycerin; polyhydric alcohol ethers such as ethylene glycol monomethyl ether, ethylene glycol monoethyl ether, ethylene glycol monobutyl ether, diethylene glycol monoethyl ether, and diethylene glycol monobutyl ether; and nitrogen-containing solvents such as N-methyl-2-pyrrolidone, substituted pyrrolidone, and triethanolamine. Also useful are monohydric alcohols such as methanol, ethanol, and isopropanol. Two or more of the above solvents may be combinedly used.

The aqueous liquid medium may be used at any pH level. Preferably, the pH is in the range from 1 to 14. The content of the liquid medium in the present invention is in the range from 0.9 to 99 mass %, preferably from 10 to 99 mass %. At the content of lower than 0.9 mass %, the viscosity of the composition tends to be extremely high, whereas at the content of higher than 99 mass %, the functional substance is liable not to perform its function.

The amphiphilic polymer employed in the liquid composition of the present invention is a block polymer or a graft polymer. Two or more kinds of amphiphilic polymers may be combinedly used in one liquid composition, if necessary. In the present invention, the block polymer is a copolymer constituted of different polymer units, or block segments, having different repeating unit structures bonded by a covalent bond, and is also called a block copolymer.

The present invention characteristically employs an amphiphilic polymer. The amphiphilic polymer has in the molecule a moiety affinitive to the medium and a moiety non-affinitive to the medium. For example, in the case where the medium is water, the amphiphilic substance forms micelle particles which are observable.

The block polymer, also called a block copolymer, is constituted of polymers of different segment structures linked together in a chain by a covalent bond. The graft polymer is constituted of a backbone polymer and a branch polymer grafted to the backbone polymer. For example, when the backbone polymer and the branch polymer have different affinity to the medium, the graft polymer can be amphiphilic. The graft polymer is also called a graft copolymer. Typically a graft polymer has constitution in which a different polymer segment is bonded to a backbone polymer by covalent bond in a shape of "T".

In the present invention, more preferably the first composition and the second composition respectively contain a block polymer. The block polymer having a linear primary structure is capable of enclosing the functional substance.

The block polymer which is a characteristic component employed in the present invention is explained below. The block polymer useful in the present invention includes known block polymers such as acrylic and methacrylic block polymers, block polymers constituted of polystyrene and other addition polymerization type or condensation polymerization type polymer, block polymers having a polyoxyethylene or polyoxyalkylene block. In the present invention, the block polymer is preferably of a type of AB, ABA, ABD, or the like. Here A, B, and D denote respectively a different block segment. Among these types of block polymers, ABD block polymers are preferred for efficient enclosing state. More preferably the ABD polymer is constituted of a hydrophobic segment A, a hydrophilic segment B, and a hydrophilic segment D in this order. Still more preferably, in the hydrophobic-hydrophilic-hydrophilic segment constitution, the segment B has nonionic hydrophilicity, and the segment D has ionic hydrophilicity.

In the present invention, the block polymer may be a graft polymer which is formed by linking a polymer segment to another polymer chain in a shape of "T". The respective segments of the block polymer may be a copolymer segment: the copolymer segment type is not limited and may be a random segment, or a graduation segment.

A block polymer containing a polyalkenyl ether structure is preferably used in the present invention. More preferably a block polymer containing a polyvinyl ether structure is used. Various methods are reported for synthesis of the block polymer containing the polyalkenyl ether structure useful in the present invention. A typical method is a cationic living polymerization reported by Aoshima et al. (Polymer Bulletin, Vol. 15, 1986, p. 417; Japanese Patent Application Laid-Open Nos. 11-322942 and 11-322866). Cationic living polymerization enables synthesis of various polymers with precisely uniform chain lengths (molecular weights), the polymers including homopolymers, copolymers constituted of two or more kinds of monomers, block polymers, graft polymers, and graduation polymers. To the polyalkenyl ether structure, a functional group can be introduced at the side chain portion. The cationic polymerization can also be conducted with a catalyst system of $HI/I_2$, $HCl/SnCl_4$, and so forth.

The segment of the block polymer containing the polyalkenyl ether may be a copolymer constituted of a vinyl ether polymer and another polymer. Preferably used are polymers having repeating units of polyvinyl ether.

General Formula (1) below shows an example of the repeating unit structure of the block polymer containing a polyvinyl ether structure.

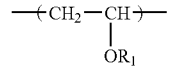

General Formula (1)

(In the Formula, $R_1$ is a linear, branched, or cyclic alkyl of 1-18 carbons, —$(CH(R_2)$—$CH(R_3)$—$O)_l$—$R_4$, or —$(CH_2)_m$—$(O)_n$—$R_4$; l and m are independently an integer of 1 to 12, n is 0 or 1; $R_2$ and $R_3$ are independently H or $CH_3$; $R_4$ is H, a linear, branched or cyclic alkyl of 1-6 carbons, -Ph, -Pyr, -Ph-Ph, -Ph-Pyr, —CHO, —$CH_2CHO$, —CO—CH=$CH_2$, —CO—C($CH_3$)=$CH_2$, or —$CH_2COOR_5$; the hydrogen atom on the carbon atom $R_4$ (when $R_4$ is not a hydrogen atom) may be substituted by a linear or branched alkyl of 1-4 carbons, or F, Cl, or Br, and the carbon atom in the aromatic ring may be substituted by a nitrogen atom, and $R_5$ is H or an alkyl of 1-5 carbons.)

In the above explanation of the symbols, -Ph is phenyl, -Pyr is pyridyl, -Ph-Ph is biphenyl, and -Ph-Pyr is pyridylphenyl; the pyridyl, biphenyl, and pyridylphenyl may be any of possible positional isomers.

The repeating unit structure represented by the above General Formula (1) is employed preferably as the A or B segment of the preferred ABD tri-block polymer of the present invention. The repeating unit structure having a functional group of an organic acid or organic acid salt characteristically used in the present invention is explained later.

The specific examples of the repeating unit structure represented by General Formula (1) are shown below. The examples below show only the structure of a side chain —$OR_1$ bonded to the main chain —($CH_2$—CH)—.

$OCH_2CH_2OC_2H_5$

$OCH_2CH_2OCH_3$

$OCH_2CH_2OPh$

$OCH_2CH(CH_3)_2$

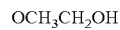
$OCH_3CH_2OH$

$OCH_2CH_2OPhPh$ (In the above formulas, Ph represents a phenylene or phenyl group.)

The amphiphilic block polymer is obtained, for example, by synthesis from a selected hydrophobic block segment and a selected hydrophilic block segment. The amphiphilic graft polymer can be obtained, for example, by grafting a hydrophobic polymer segment to a hydrophilic polymer.

The block polymer used in the present invention has a molecular weight distribution, Mw (weight-average molecular weight)/Mn (number average molecular weight), of preferably not more than 2.0, more preferably not more than 1.6, still more preferably not more than 1.3, still more preferably not more than 1.2. The narrower molecular weight distribution enables more uniform dispersion of the functional substance.

The number-average molecular weight Mn of the block polymer or graft polymer used in the present invention is preferably not lower than 200, more preferably not lower than 3000, but preferably not higher than 1,000,000. The polymer of the number-average molecular weight of less than 200 tends to decrease dispersion stability of the functional substance. The number-average molecular weight and the weight-average molecular weight of the polymer of the present invention can be measured by volume exclusion chromatography (gel permeation chromatography (GPC)).

The content of the block or graft polymer in the liquid composition of the present invention ranges preferably from 0.1 to 90 mass %, more preferably from 1 to 50 mass %. At the content of less than 0.1 mass %, the state of dispersion or dissolution of the functional substance in the liquid composition tends to be insufficient, whereas at the content of more than 90 mass %, the viscosity of the composition tends to be excessively high.

The functional substance contained in the liquid composition is preferably enclosed by the block or graft polymer for preventing deterioration caused by environmental conditions. An amphiphilic block or graft polymer, which is capable of enclosing readily the functional substance by formation of self-assembly structure, is effective in this respect. The block or graft polymer molecule is preferably flexible for higher dispersion stability and higher enclosing ability, since the flexible polymer molecule readily twine physically around the functional material surface. The flexibility of the polymer molecule is desirable also in view of ease of formation of a coating layer on a recording medium, as described later. For this purpose, the main chain of the block polymer has its glass transition temperature (Tg) preferably of not higher than 20° C., more preferably not higher than 0° C., still more preferably not higher than −20° C. In this respect, the polymers having a polyvinyl structure are useful owing to low glass transition temperature and flexibility thereof.

In the liquid composition of the present invention, the functional substance is enclosed by the block or graft polymer. The enclosure state can be achieved, for example, by adding, to micelles of the block or graft polymer formed in water, a solution of a colorant in a water-insoluble organic solvent, and subsequently evaporating the organic solvent. Otherwise the enclosure state can be achieved by dissolving or dispersing uniformly together the block or graft polymer and the colorant in an organic solvent, and causing phase inversion into an aqueous solvent by self-assembly phenomenon.

The remaining solvent may be distilled off. In another process, for example, to micelles of a block or graft polymer in water, a dispersion of a pigment in a water-insoluble solvent is added to achieve the enclosure state.

The state of enclosure can be confirmed by instrumental analysis such as electron microscopy, and X-ray diffraction. The enclosure in a micelle state can be indirectly confirmed by separation of the colorant and the polymer from the solvent under micelle collapse conditions.

As described above, the block or graft polymer is preferably brought into a micelle state. For the micelle formation, the block or graft polymer in the present invention is preferably amphiphilic. In this sense, the block or graft polymer has preferably a polymer segment of an ionic repeating unit structure. The ionic repeating unit structure is desirable for formation of the enclosure state and also for the reason described later. In the present invention, use of a block polymer is preferred in view of the dispersion stability, the enclosure of the functional substance, the viscosity, and other properties.

The ratio of the functional substance enclosed by the block or graft polymer to the total amount of the functional substance is preferably not less than 90 mass %, more preferably not less than 95 mass %, still more preferably not less than 98 mass %. This ratio can be measured by instrumental analysis such as electron microscopy, and X-ray analysis; color density analysis for colorants; and the aforementioned indirect method.

The liquid composition of the present invention may contain further an additive such as antioxidant, a viscosity-reducing agent, a UV-absorbing agent, a surfactant, and a fungicide.

In the present invention, at least two kinds of liquid compositions are used, the compositions respectively containing a functional substance, a block or graft polymer and a liquid medium as described above. Typically as one of the embodiments of the present invention, an image forming method is provided in which colorants are used as the functional substances. In this method, when the two compositions are brought into contact on a recording medium, at least one of the liquid compositions responds to another liquid composition to cause viscosity increase to prevent diffusion of both liquid compositions or to facilitate drying. Thus, the two liquid compositions are different from each other. Preferably the block or graft polymers are different, and respond to each other to cause change of the properties of the block or graft polymers.

Another example like the above case is explained more specifically. An aqueous dispersion ink is provided in which a black pigment is enclosed in micelles formed by an amphiphilic block polymer, the block polymer having an organic acid group salt of pKa of 6 as the hydrophilic unit, and the pH being adjusted to 9. Another aqueous dispersion ink is provided in which a yellow pigment is enclosed in micelles formed by another amphiphilic block polymer, the block polymer having an organic acid group salt of pKa of 2 as the hydrophilic unit, and the pH being adjusted to 2. The two ink compositions respectively have an ionic hydrophilic group, which are adjusted to be in a similar dissociation state by controlling the pH in correspondence with the pKa thereof. Thereby, enclosure of the colorants and dispersion of the colorants are improved, and interaction between the micelle particles is prevented by ionic repulsion to lower the viscosity. When the two ink compositions are applied by an ink-jet method for recording in adjacency to come into contact with each other, the pH of the first ink composition is changed to be more acidic. This neutralizes the sodium salt of the hydrophilic carboxylic acid to increase interaction between the micelle particles to increase the viscosity of the contact portion of the ink compositions. In an extreme case, the particles can flocculate. Thus, the viscosity of the composition increases to suppress bleeding or color mixing. For this viscosity increase, the pKa of the hydrophilic group of one block polymer should be different from the pKa of hydrophilic group of the other block polymer. Preferably the difference of pKa is not less than 0.3, more preferably not less than 1. Also the pH of the composition is preferably different preferably by 0.3, more preferably not less than 1, still more preferably not less than 2, still more preferably more than 4. A larger pH difference is desirable for higher freedom in designing the ink composition.

In the present invention, as described above, when a first liquid composition and a second liquid composition are brought into contact, the viscosity of at least one of the liquid compositions increases. The contact of the first liquid composition and the second liquid composition herein means the contact of the liquid face of the first liquid composition with the liquid face of the second liquid composition, or the contact of the liquid compositions in a swollen state on a recording medium, but does not mean mechanical mixing of the two liquid compositions in a vessel. For example, in ink-jet recording, when simultaneously ejected liquids of the two liquid compositions come into contact on a recording medium, the liquid compositions diffusing from the contact interface into the interior will change their pKa and pH to cause strong interaction to increase the viscosity of at least one of the compositions.

In the present invention, usually the liquid composition containing a polymer having higher pKa becomes viscous.

Examples of the preferred combination of the organic acids having a higher pKa and a lower pKa, are an aliphatic carboxylic acid and aromatic carboxylic acid; aliphatic carboxylic acid and aromatic dicarboxylic acid; aliphatic carboxylic acid and halogen-substituted benzoic acid; aliphatic carboxylic acid and sulfonic acid; aromatic carboxylic acid and aromatic dicarboxylic acid; aromatic carboxylic acid and halogen-substituted benzoic acid; aromatic carboxylic acid and sulfonic acid; aromatic dicarboxylic acid and aromatic carboxylic acid; aromatic dicarboxylic acid and halogen-substituted benzoic acid; and aromatic dicarboxylic acid and sulfonic acid.

Among the above organic acids, at least one of the organic acids has pKa of preferably not higher than 2, more preferably not higher than 0. The organic acid is preferably selected from benzoic acid, aliphatic dicarboxylic acids, aromatic dicarboxylic acids, halogen-substituted benzoic acids, and sulfonic acids.

In the present invention, the functional substance is preferably dispersed in the liquid composition. A typical composition is a disperse ink composition employing a colorant. The colorant, like a pigment or a dye, is used in a dispersion state, not in a solution state. The colorant-disperse ink composition of the present invention becomes viscous or coagulates effectively in comparison with a typical conventional aqueous dye ink composition employing a water-soluble dye. Therefore the colorant-disperse ink composition of the present invention is improved remarkably in prevention of the color diffusion, shortening of the drying time, and shortening of the fixation time. In particular, in the case where an image is formed by use of two kinds of liquid ink compositions of the present invention, both of the liquid ink compositions are preferably of a colorant dispersion type. Further, the colorants are preferably enclosed respectively by the amphiphilic block polymers.

In the liquid composition employed in the aforementioned image formation, the block polymer is preferably in a micelle state for increase of the viscosity, prevention of color mixing, and shortening the drying time. The colorant like the pigment is preferably enclosed in the micelle.

In the composition, for enclosure of a functional substance like a colorant, the block polymer has a weight-average molecular weight of not less than 10,000, more preferably not less than 15,000. In some cases, the weight-average molecular weight is preferably not less than 30,000. For increase of viscosity, prevention of color diffusion, and shortening of drying time, the weight-average molecular weight of the block polymer is preferably not less than 10,000, more preferably not less than 15,000, still more preferably not less than 30,000. In particular, the hydrophobic segment of the block copolymer has a number-average molecular weight of not less than 5,000, more preferably not less than 10,000.

The symbol "pKa" denotes an acid dissociation exponent, which is defined as the negative logarithm of the acid dissociation constant, Ka. The acid dissociation constant, Ka, is defined as $[H^+] [A^-]/[HA]$, wherein [HA] denotes the concentration of undissociated acid HA in a solution of HA, and, $[H^+]$ and $[A^-]$ denote the concentrations of dissociated $H^+$ and a counter ion thereof in the solution, respectively. Consequently, the value of pKa can be obtained from the equation:

$$pKa = -\log [H^+] - \log([A^-]/[HA]) = pH - \log([A^-]/[HA])$$

In the present invention, pKa does not employ a polymer but one carboxylic acid repeating unit as a unit of mole number.

Examples of the organic acid salt units for combination of units of different pKa values are shown by the repeating units represented by General Formulas (2), (3), (4), (5), and (6) below

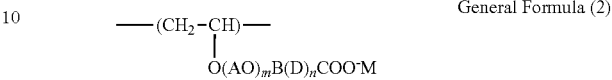

General Formula (2)

(wherein A is a substituted or unsubstituted linear or branched alkylene of 1-15 carbon atoms; m is an integer of 0-30; when m is 2 or more, each A represents independently the above alkylene; B is a single bond or a substituted or unsubstituted alkylene; D is an aromatic ring structure; n is an integer of 1-10; when n is 2 or more, each D represents independently the above group; and M is a monovalent or multivalent metal cation.) In the above General Formula (2), the substituent which may be attached to the alkylene group A or B includes alkyl groups. The aromatic ring structure D is exemplified by phenylene and naphthylene.

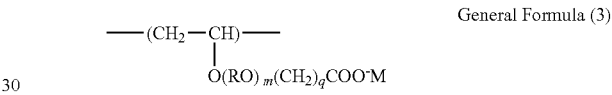

General Formula (3)

(wherein R is a substituted or unsubstituted linear or branched alkylene of 1-15 carbon atoms; m is an integer of 0-30; when m is 2 or more, each R represents independently the above alkylene; q is an integer of 1-30; and M is a monovalent or multivalent metal cation.)

The metal cation M in the above General Formulas (2) and (3) includes ions of sodium, potassium, and lithium.

Specific examples of the repeating unit structure represented by General Formula (2) are shown below. The formulas below show only the side chains —O(AO)$_m$B(D)$_n$COO$^-$M attached to —(CH$_2$—CH)— of the repeating unit structure.

OCHCH$_2$OPhCOO$^-$M

OCH$_2$CH$_2$PhCOO$^-$M

OCH$_2$CH$_2$OPhPhCOO$^-$M

OCH$_2$CH$_2$ONpCOO$^-$M

OCH$_2$CH$_2$CH$_2$OPhCOO$^-$M

OCH$_2$CH(CH$_3$) OPhCOO$^-$M

OCH$_2$CH$_2$O(CH$_2$)$_{20}$PhCOO$^-$M

O(CHCH$_2$O)$_2$ (CH$_2$)$_2$PhCOO$^-$M

O(CH$_2$CH$_2$O)$_3$(CH$_2$)$_3$PhCOO$^-$M

O(CH$_2$CH$_2$O)$_{10}$PhCOO$^-$M

O(CH$_2$CH$_2$O)$_{20}$PhCOO$^-$M

O(CH$_2$CH$_2$O)$_2$ (CH$_2$)$_6$PhCOO$^-$M

O(CH$_2$CH$_2$O)$_5$ (CH$_2$)$_7$OPhCOO$^-$M

O(CH$_2$CH$_2$O)$_6$(CH$_2$)$_8$OPhCOO$^-$M

O(CH$_2$CH$_2$O)$_{10}$(CH$_2$)$_{10}$OPhCOO$^-$M

O(CH$_2$CH$_2$O)$_{15}$(CH$_2$)$_{15}$OPhCOO$^-$M

O(CH$_2$CH$_2$O)$_2$(CH$_2$)$_{20}$OPhCOO_M

OCH$_2$CH$_2$CH$_2$CH$_2$CH$_2$CH$_2$CH$_2$CH$_2$O(CH$_2$)$_2$OPhCOO$^-$M

OCH$_2$CH$_2$CH$_2$CH$_2$O(CH$_2$)$_4$OPhCOO$^-$M

OCH$_2$CH$_2$CH$_2$CH$_2$O(CH$_2$)$_4$OPhCOO$^-$M

OCH$_2$CH$_2$CH$_2$CH$_2$CH$_2$CH$_2$CH$_2$CH$_2$O(CH$_2$)$_5$OPhCOO$^-$M

OCH$_2$CH$_2$CH$_2$CH$_2$CH$_2$CH$_2$O(CH$_2$)$_6$OPhCOO$^-$M

OCH(CH$_3$)CH$_2$O(CH$_2$)$_7$OPhCOO$^-$M

OCH(CH$_3$)CH$_2$O(CH$_2$)$_8$OPhCOO$^-$M

Specific examples of the repeating unit structure represented by General Formula (3) are shown below. The formulas below show only the side chains —O(RO)$_m$(CH$_2$)$_q$COO$^-$M attached to —(CH$_2$—CH)— of the repeating unit structure.

OCH$_2$CH$_2$O(CH$_2$)$_2$COO$^-$M

OCH$_2$CH$_2$O(CH$_3$)$_3$COO$^-$M

OCH$_2$CH$_2$O(CH$_2$)$_4$COO$^-$M

OCH$_2$CH$_2$O(CH$_2$)$_5$COO$^-$M

OCH$_2$CH$_2$O(CH$_2$)$_6$COO$^-$M

OCH$_2$CH$_2$O(CH$_2$)$_7$COO$^-$M

OCH$_2$CH$_2$O(CH$_2$)$_8$COO$^-$M

OCH$_2$CH$_2$O(CH$_2$)$_{10}$COO$^-$M

OCH$_2$CH$_2$O(CH$_2$)$_{15}$COO$^-$M

OCH$_2$CH$_2$O(C H$_2$)$_{20}$COO$^-$M

O(CH$_2$CH$_2$O)$_2$(CH$_2$)$_2$COO$^-$M

O(CH$_2$CH$_2$O)$_3$(CH$_2$)$_8$COO$^-$M

O(CH$_2$CH$_2$O)$_{10}$(CH$_2$)$_4$COO$^-$M

O(CH$_2$CH$_2$O)$_{20}$(CH$_2$)$_5$COO$^-$M

O(CH$_2$CH$_2$O)$_2$(CH$_2$)$_6$COO$^-$M

O(CH$_2$CH$_2$O)$_5$(CH$_2$)$_7$COO$^-$M

O(CH$_2$CH$_2$O)$_6$(CH$_2$)$_8$COO$^-$M

O(CH$_2$CH$_2$O)$_{10}$(CH$_2$)$_{10}$COO$^-$M

O(CH$_2$CH$_2$O)$_{15}$(CH$_2$)$_{15}$COO$^-$M

O(CH$_2$CH$_2$O)$_2$(CH$_2$)$_{20}$COO$^-$M

OCH$_2$CH$_2$CH$_2$CH$_2$CH$_2$CH$_2$CH$_2$CH$_2$O(CH$_2$)$_2$COO$^-$M

OCH$_2$CH$_2$CH$_2$CH$_2$O(CH$_2$)$_3$COO$^-$M

OCH$_2$CH$_2$CH$_2$CH$_2$O(CH$_2$)$_4$COO$^-$M

OCH$_2$CH$_2$CH$_2$CH$_2$CH$_2$CH$_2$CH$_2$CH$_2$O(CH$_2$)$_5$COO$^-$M

OCH$_2$CH$_2$CH$_2$CH$_2$CH$_2$CH$_2$O(CH$_2$)$_6$COO$^-$M

OCH(CH$_3$)CH$_2$O(CH$_2$)$_7$COO$^-$M

OCH(CH$_3$)CH$_2$O(CH$_2$)$_8$COO$^-$M (In the formulas, Ph represents 1,4-phenylene, or 1,3-phenylene; Np represents 2,6-naphthylene, 1,4-naphthylene, or 1,5-naphthylene.)

General Formula (4)

$$-(CH_2-CH)- \atop |\atop OR^{40}$$

(wherein R$^{40}$ represents —X—(Y)$_t$—(COOH)$_r$, or —X—(Y)$_t$—(COO-M)$_r$; X is a linear, branched, or cyclic alkylene of 1-20 carbons, —(CH(R$^5$)—CH(R$^6$)—O)$_p$—(CH$_2$)$_m$—(O)$_n$—, or (CH$_2$)$_m$—(O)$_n$—(CH$_2$)$_q$—, or at least one of the methylene group thereof is replaced by an oxygen atom, a carbonyl group, or an aromatic ring structure; r is 1 or 2; p is an integer of 1-20; m is an integer of 0-36; n is 1 or 0; q is an integer of 0-20; Y represents an aromatic ring structure with at least one hydrogen atom of the ring substituted by a fluorine atom; t is an integer of 0-10; when t is 2 or more, each Y is independent; M represents a monovalent or multivalent cation; and R$^5$ and R$^6$ are respectively a hydrogen atom or an alkyl independently.

Specific examples of the repeating unit structure represented by General Formula (4) are shown below. The formulas below show only the side chains —OR$^{40}$ attached to —(CH$_2$—CH)— of the repeating unit structure.

OCH$_2$CH$_2$OPh(4F)COOH

OCH$_2$CH$_2$OPh(4F)COO$^-$M

OCH$_2$CH(C$_2$H$_5$)OPh(3F)COO$^-$M

O(CH$_2$CH$_2$O)$_s$Np(5F)COOH

OCH$_2$CH$_2$O(CH$_2$)$_3$Ph(3F)COO$^-$M

O(CH$_2$CH$_2$O)$_7$PhPh(3F)COO$^-$M

OCH$_3$CH$_2$OPyPh(2F)COO$^-$M

O(CH$_2$CH$_2$O)$_{20}$Ph(2F)COOH

General Formula (5)

$$-(CH_2-CH)- \atop |\atop OR^{50}$$

(wherein R$^{50}$ represents —X—(Y)$_t$—SO$_3$H, or —X—(Y)$_t$—SO$_3$-M; X is a linear, branched, or cyclic alkylene of 1-20 carbons, —(CH(R$^5$)—CH(R$^6$)—O)$_p$—(CH$_2$)$_n$—(O)$_n$—, or —(CH$_2$)$_m$—(O)$_n$—(CH$_2$)$_q$—, or at least one of the methylene group may be replaced by a carbonyl group, an oxygen atom, or an aromatic ring structure; p is an integer of 1-20; m is an integer of 0-36; n is 1 or 0; q is an integer of 0-20; Y represents a substituted or unsubstituted aromatic ring structure; t is an integer of 0-10; when t is 2 or more, each Y is independent; M represents a monovalent or multivalent cation; and $R^5$ and $R^6$ are respectively a hydrogen atom or an alkyl independently.

Specific examples of the repeating unit structure represented by General Formula (5) are shown below. The formulas below show only the side chains —$OR^{50}$ attached to —($CH_2$—CH)— of the repeating unit structure.

$OCH_2CH_2OPhSO_3H$ $OCH_2CH_2OPhSO_3^-M$ $OCH_2CH_2PhSO_3H$ $OCH_2CH_2PhSO_3^-M$ $OCH_2CH_2OPhPhSO_3^-M$ $OCH_2CHO_2NpSO_3^-M$ $OCH_2CH_2CH_2OPhSO_3H$ $OCH_2CH_2Ph(CH_3)SO_3^-M$ $OCH_2CH_2CH_2CH_2PhSO_3^-M$ $OCH_2CH_2CH_2OPhSO_3^-M$ $OCH_2CH(CH_3) OPhSO_3^-M$ $OCH_2CH(C_2H_5)OPhSO_3H$ $OCH_3CH(C_3H_7)OPhSO_3^-M$ $O(CH_2CH_2O)_2PhSO_3H$ $OCH_2CH_2O(CH_2CH_2CH_2O)_2PhSO_3H$ $OCH_2CH_2OPyPhSO_3^-M$ $OCH_2CH_2OPyPhSO_3^-M$ $O(CH_2CH_2O)_2 (CH_2)_2PhSO_3H$ $O(CH_2CH_2O)_3(CH_2)_2PhSO_3^-M$ $O(CH_2CH_2O)_{20}PhSO_3H$ $O(CH_2CH_2O)_2 (CH_2)_5OPhSO_3^-M$ $O(CH_2CH_2O)_6 (CH_2)_8OPhSO_3H$ $O(CH_2CH_2O)_{10}(CH_2)_{10}OPhSO_3^-M$ $O(CH_2CH_2O)_2 (CH_2)_{20}OPhSO_3H$ $OCH_2CH_2CH_2CH_2CH_2CH_2CH_2CH_2O(CH_2)_2 OPhSO_3^-M$ $OCH_2CH_2CH_2CH_2O(CH_2)_4OPhSO_3H$ $OCH_2CH_2CH_2CH_2CH_2CH_2CH_2CH_2O(CH_2)_5 OPhSO_3^-M$ (In the formulas, Ph represents 1,4-phenylene, or 1,3-phenylene; Py represents 2,5-pyrimidyl; and Pyr represents 2,5-pyridyl.)

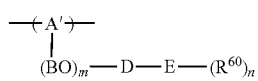

General Formula (6)

(wherein A' represents a substituted or unsubstituted polyalkenyl ether group; B represents a linear or branched alkylene of 1-15 carbon atoms; m is an integer of 0-30; when m is 2 or more, each B is independent; D represents a single bond or a substituted or unsubstituted linear or branched alkylene of 1-10 carbon atoms; E represents a substituted or unsubstituted aromatic ring, a substituted or unsubstituted condensed ring, or a structure of two or three of substituted or unsubstituted aromatic rings combined by a single bond; $R^{60}$ represents —COOH, or —COO$^-$M (M is monovalent or multivalent metal cation); n is an integer of 2 or more; $R^{60}$ is a substituent of the aromatic ring E; and hydrogen atoms not replaced by $R^{60}$ of the aromatic ring may be substituted.)

Specific examples of the repeating unit structure represented by General Formula (6) are shown below.

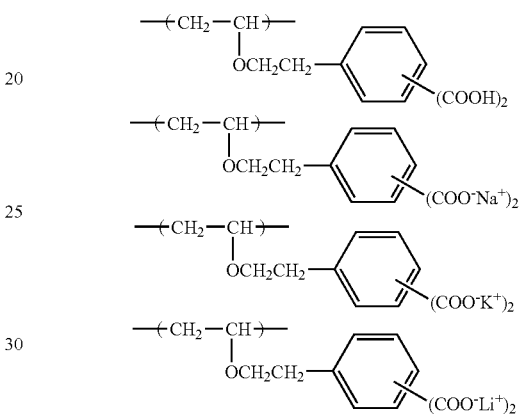

The above specific examples of organic acids having a structure of General Formula (2) or (3) are respectively aliphatic carboxylic acid, and aromatic carboxylic acids. Typically, the pKa levels are respectively 4.9 and 4.2, the pKa difference being about 0.7. These are useful as the hydrophilic group of the block or graft polymer employed in the respective liquid composition.

The organic acid having the structure shown by General Formula (4) is a halogen-substituted aromatic carboxylic acid. A two-fluorine or three-fluorine substituted aromatic carboxylic acid has typically a pKa of about 2-3, and a four-fluorine substituted aromatic carboxylic acid has a pKa of about 1-2. This pKa differs from that of the compounds of General Formula (1) or, (2) by about 3, not less than about 1. Therefore, the organic acids of General Formula (4) are suitable as the hydrophilic group of the block or graft polymer employed in the liquid composition of the present invention.

The organic acid having the structure shown by General Formula (5) is a sulfonic acid, having generally a pKa of less than 0. This pKa differs from that of the compounds of General Formula (1) or (2) by about 4 or more. Therefore, the organic acids of General Formula (5) are suitable as the hydrophilic group of the block or graft polymer employed in the liquid composition of the present invention. Further the pKa differs from that of the compounds of General Formula (3) by about 1-3 or more. Therefore, the organic acids of General Formula (5) are suitable as the hydrophilic group of the block or graft polymer employed in the liquid composition of the present invention.

The organic acid having the structure shown by General Formula (6) is a polycarboxylic acid, having generally a pKa of about 4. This pKa differs from that of the compounds of General Formula (3) or (4) by about 1-3 or more. Therefore, the organic acids are suitable as the hydrophilic group of the block or graft polymer employed in the liquid composition of the present invention. Further the pKa differs from that of the compounds of General Formula (1) or (2) by about 0.3-0.7. Therefore, the organic acids of General Formula (6) are suitably used in combination of the compound of General Formula (1) or (2).

In a preferred embodiment of the present invention, two liquid compositions which contain respectively a different kind of amphiphilic block copolymer having a different pKa are used at different pH levels, and on contact of the compositions, the pH of one composition comes to change to result in increase of the viscosity, thereby preventing color diffusion, enabling decrease of fixation time and drying time. Other than the pKa difference, there is a preferred structure of the amphiphilic polymer. The amphiphilic block polymer having higher pKa has an organic acid block segment or an organic acid salt block segment of polymerization degree of preferably not more than 50, or in some cases not more than 30. This is preferable for forming the colorant enclosure state for effective image formation. For achieving the enclosure state, the polymerization degree of the repeating unit other than the organic acid or organic acid salt block segment is preferably not less than 50, more preferably not less than 100.

The composition of the present invention may contain, in addition to the aforementioned components, a modifiers or an additives such as an antioxidant, a viscosity controlling agent, a surfactant, and a fungicide.

The increase of viscosity in the composition of the present invention is achieved by the amphiphilic block or graft polymer, the constituting element of the present invention, and can be achieved sufficiently without a further viscosity-increasing additive, but may be added for increasing the effect.

The liquid composition of the present invention is useful as an ink (using a colorant as the functional substance) for ink-jet printing. An ink-jet apparatus therefore is explained below. The useful ink-jet apparatus includes piezo ink-jet type apparatuses employing a piezo element, and bubble jet type apparatuses conducting recording by bubbling the ink by thermal energy.

The ink-jet recording apparatus is explained below shortly by reference to FIG. 1. The apparatus constitution shown in FIG. 1 is merely an example, and does not limit the present invention.

FIG. 1 is a block diagram illustrating constitution of an ink-jet recording apparatus.

FIG. 1 shows the case in which recording is conducted on a recording medium by moving a recording head. In FIG. 1, CPU 50 controls the entire operation of the recording apparatus. To CPU 50, are connected X-direction driving motor 56 and Y-direction driving motor 58 for driving the head 70 in XY directions respectively through X-motor driving circuit 52 and Y-motor driving circuit 54. CPU gives instruction to drive X-driving motor 56 and Y-driving motor 58 respectively through X-motor driving circuit 52 and Y-motor driving circuit 54 to place recording head 70 at an intended position of the recording medium.

As shown in FIG. 1, head driving circuit 60 is connected to head 70 in addition to X-direction driving motor 56 and Y-direction driving motor 58. CPU 50 controls head-driving circuit 60 to drive head 70 to conduct ejection of an ink-jet ink and other operations. X-encoder 62 and Y-encoder 64 for detection of the position of the head are connected to CPU 50 to input the information on the position of head 70 to CPU 50. Into program memory, a control program is installed. According to the position information from X-encoder 62 and Y-encoder 64, CPU 50 moves head 70 onto an intended position on the recording medium and drive the head to eject the ink-jet ink. In such a manner, an image is recorded on the recording medium. With an image-recording apparatus employing plural ink-jet inks, the above operation is conducted with each of the ink-jet inks prescribed times to record an intended image on the recording medium.

After ejection of the ink-jet ink, head 70 may be moved to the position where an ink-removing means (not shown in the drawing) is placed for removing excessive ink adhering to the head to clean head 70 by wiping or a like operation. The head cleaning can be conducted by a conventional method.

After the image recording is completed, the recording medium carrying the image is replaced by a fresh recording medium by a recording medium delivery mechanism not shown in the drawing.

The above embodiment of the present invention may be modified within the gist of the invention. For example, differently from the above embodiment in which head 70 is moved in XY axis directions, head 70 is moved only in X axis direction (or Y axis direction) and the recording medium is moved in Y axis direction (or X axis direction) to conduct image recording in combination of the both movements.

The present invention is effective in the head having a thermal energy-generating means (e.g., an electrothermal transducer, and a laser beam emitter) for ink-jet ink ejection. With such a system, the recording can be conducted with fineness of the image. The use of the ink of the present invention enables more excellent image recording.

The typical constitution and principle of the above apparatus having a thermal energy-generating means is disclosed, for example, U.S. Pat. Nos. 4,723,129 and 4,740,796. This disclosed basic principle is preferably employed. The system based on the above principle is applicable to on-demand types and continuous types of apparatuses. In particular, the present invention is effective in the on-demand type apparatus, since the bubble is formed in a liquid by applying a driving signal to electrothermal transducer placed in a liquid flow path to generate heat and to cause abrupt temperature rise of the liquid above the nuclear boiling temperature in accordance with ejection information, thereby bubble formation being in 1:1 correspondence with the driving signal. The liquid is ejected by action of growth and shrink of the bubble through an ejection orifice to form at least one liquid droplet. Signals are preferably in a shape of pulses for causing immediate and suitable growth and shrink of the bubbles to eject the liquid with high responsiveness. The suitable pulse-shaped driving signals are disclosed in U.S. Pat. Nos. 4,463,359 and 4,345,262. The ejection can be conducted more efficiently under the conditions disclosed in U.S. Pat. No. 4,313,124 relating to a temperature elevation rate of the heating face.

The present invention includes the constitution of the head having an ejection orifice, a liquid flow path, and an electrothermal transducer (linear liquid flow path, or rectangular liquid flow path) disclosed in the specification of the above patents as well as the constitution of the head having additionally a heating device at a bending portion of the flow path disclosed in U.S. Pat. Nos. 4,558,333 and 4,459,600. Further, the present invention is effective also in the constitution having a slit common to plural electrothermal transducers as an ejection opening disclosed in Japanese Patent Application Laid-Open No. 59-123670, and in the constitution having an opening for absorbing a pressure wave of thermal energy corresponding to an ejection assembly disclosed in Japanese Patent Application Laid-Open No. 59-138461. Thus the present invention enables precise and sure ejection of an ink-jet ink regardless of the shape of the head.

The present invention is effectively employed in an image forming apparatus having a full-line type of head having a length corresponding to the largest breadth of the recording medium. This type of head may be constituted of combination of plural heads, or an integrally formed one head to cover the full length of the recording medium.

The present invention is effective also in a serial type of head which is fixed to the apparatus main body, or an exchangeable tip type of head which is connected electrically to the main body is fed with ink from the main body on mounting onto the main body of the apparatus.

The apparatus of the present invention may be provided with a liquid removal means additionally, whereby the ejection efficiency is further improved.

An auxiliary means is additionally provided preferably in constitution of the apparatus of the present invention for stabilizing the effect of the present invention. The auxiliary means is exemplified by a head capping means, a head pressurizing or sucking means, a heating means other than the electrothermal transducer, a preliminary heating means comprising a combination of an electrothermal transducer and an additional heater, and a preliminary ejection means other than the ink ejection means.

The present invention is the most effective for the system conducting the aforementioned film boiling.

In the apparatus of the present invention, the amount of the ink ejected from one ejection orifice of the ink-jet ink ejection head ranges preferably from 0.1 pL to 100 pL.

The ink as the liquid composition of the present invention is useful also in an indirect recording apparatus employing a recording system which conducts printing an image with an ink on an intermediate transfer medium and subsequently transferring the image onto a recording medium like a paper sheet as well as in a recording apparatus of direct recording system utilizing an intermediate transfer medium.

EXAMPLE

The present invention is explained below in detail by reference to Examples without limiting the invention in any way.

<Synthesis Example and Used Block Polymer>

(1) An AB type block polymer composed of isobutyl vinyl ether (IBVE: A block component) and sodium 4-(2-vinyloxyethoxy)benzoate (B block component); pKa of the acid of this polymer is 4.27.

A flask having a three-way stopcock was purged with nitrogen, and was heated under nitrogen atmosphere at 250° C. to eliminate adsorbed water. After the system was brought to room temperature, were added thereto 20 mmol of isobutyl vinyl ether (IBVE), 16 mmol of ethyl acetate, 0.1 mmol of 1-isobutoxyethyl acetate, and 11 mL of toluene, and the reaction system was cooled. When the temperature in the system came to be at a temperature of 0° C., 0.2 mmol of ethylaluminum sesquichloride (an equimolar mixture of diethylaluminum chloride and ethylaluminum dichloride) to initiate polymerization. The molecular weight of the resulting polymer was monitored time-divisionally by column chromatography (GPC) to confirm completion of the polymerization of A-component.

Thereto, 10 mmol of the B-block component dissolved in toluene was added and the polymerization was continued. After 16 hours, the polymerization was stopped by adding an aqueous 0.3 mass % ammonia/methanol solution. The reaction mixture solution was diluted with dichloromethane, and washed three times with 0.6M hydrochloric acid, and three times with distilled water. The obtained organic solution was concentrated, evaporated to dryness, and vacuum-dried. The dried matter was dialyzed by using methanol as the solvent with semipermeable cellulose membrane repeatedly to remove monomeric compound to obtain diblock polymer.

The polymer was constituted of the blocks in a polymerization ratio A/B=200/30, having a number-average molecular weight of 35000 and a weight-average molecular weight of 43200. The polymer compound was identified by NMR and GPC. A portion of 26 mass parts of the block polymer was stirred with 200 mass parts of an aqueous sodium hydroxide (pH 13) solution at 0° C. for three days to obtain a solution of a polymer carboxylic acid sodium salt. The solution was dialyzed to eliminate excess sodium hydroxide and dried. The solvent was evaporated off to obtain a sodium carboxylic acid salt type of AB block polymer.

(2) Another AB block polymer which is constituted of isobutyl vinyl ether (IBVE: A-block component) and sodium 6-(2-vinyloxyethoxy)hexanoate (B-block component) was synthesized in the same manner as in the process (1) above. The polymer was constituted of the blocks in a polymerization ratio A/B=200/28, having a number-average molecular weight of 36000 and a weight-average molecular weight of 45000 (the both molecular weights measured before hydrolysis). The pKa of the acid of this polymer was 4.92.

(3) A diblock polymer which is constituted of isobutyl vinyl ether and 2-vinyloxy-1-biphenyloxyethyl (A-block component), and a sodium salt of 5-(2-vinyloxyethoxy)benzene-1,3-dicarboxylic acid (B-block component) was synthesized in the same manner as in the above process (1). The polymer was constituted of the blocks in a polymerization ratio A/B=100/15, having a number-average molecular weight of 15000 and a weight-average molecular weight of 18200 (the both molecular weights measured before hydrolysis). The pKa of the acid of this polymer was 4.19.

(4) A diblock polymer which is constituted of isobutyl vinyl ether and 2-vinyloxy-1-biphenyloxyethyl (the two-monomer copolymerization component: A-block component), and a sodium salt of 4-(2-vinyloxyethoxy)-2,3,5,6-tetrafluorobenzoic acid (B-block component) was synthesized in the same manner as in the above process (1). The polymer was constituted of the blocks in a polymerization ratio A/B=100/12, having a number-average molecular weight of 15300 and a weight-average molecular weight of 19500 (the both molecular weights measured before hydrolysis). The pKa of the acid of this polymer was 2.11.

(5) A diblock polymer which is constituted of isobutyl vinyl ether and 2-vinyloxy-1-biphenyloxyethyl (A-block component), and sodium 4-(2-vinyloxyethoxy)benzenesulfonate (B-block component) was synthesized in the same manner as in the above process (1). The polymer was constituted of the blocks in a polymerization ratio A/B=100/15, having a number-average molecular weight of 14800 and a weight-average molecular weight of 18500 (the both molecular weights measured before hydrolysis). The pKa of the acid of this polymer was −0.81.

(6) A triblock polymer which is constituted of isobutyl vinyl ether and 2-vinyloxy-1-biphenyloxyethyl (A-block component), 2-methoxyethyl vinyl ether (B-block component), and sodium 4-(2-vinyloxyethoxy)benzoate (C-block component) was synthesized in the same manner as in the above process (1). The polymer was constituted of the blocks in a polymerization ratio A/B/C=100/116/9, having a number-average molecular weight of 25300 and a weight-average molecular weight of 30800 (the both molecular weights measured before hydrolysis). The pKa of the acid of this polymer was 4.34.

(7) A block copolymer (7) was synthesized in the same manner as in the above process (1) except that 2-ethoxyethyl vinyl ether was used in place of IBVE as the A component of the block copolymer (1) of Synthesis Example. The pKa of the acid of this polymer was 4.94. The Tg of this polymer was −21° C. by DSC (Model DSC 7, Perkin Elmer Co.).

Example 1

To 178 mass parts of deionized water, were added 3 mass parts of a magenta pigment (C.I. Pigment Red 122), 5 mass parts of the block copolymer of the above synthesis example (1), and 15 mass parts of diethylene glycol. The pH of the mixture was adjusted to 6.7. The mixture was treated for dispersion by an ultrasonic homogenizer. The homogenized mixture was filtered through a 1-μm filter by application of pressure to obtain an aqueous pigment-disperse ink. The dispersion state of the pigment was excellent.

To 178 mass parts of deionized water, were added 3 mass parts of a black pigment (trade name: MOGUL-L, Cabot Co.), 5 mass parts of the block copolymer of the above synthesis example (2), and 15 mass parts of diethylene glycol. The pH of the mixture was adjusted to 12.1. The mixture was treated for dispersion by an ultrasonic homogenizer. The homogenized mixture was filtered through a 1-μm filter by application of pressure to obtain another aqueous pigment-disperse ink. The dispersion state of the pigment was excellent.

Ink-jet recording was conducted with the above two inks by means of an ink-jet printer (Bubble Jet®, trade name BJP 800, Canon K.K.). The ink compositions were filled in ink tanks of the printer, and recording was conducted to form a pattern of alternate black-and-magenta with intervals of 1 mm on a plain paper sheet (trade name TKCLA 4, Canon K.K.). Little blur was observed at the boundary between the black region and the magenta region. By observation by microscopy, the breadth of the blur was found to be 0.11 mm.

Comparative Example 1

A printing test was conducted in the same manner with a black ink used in Example 1 above and a magenta ink supplied with the printer BJF-800. As the result, blurring was observed visually clearly at the boundary between the black region and the magenta region. The average breadth of the blur was found to be 0.24 mm by observation by microscopy.

Example 2

In 70 mass parts of dimethylformamide, were dissolved 26 mass parts of the block copolymer (2) used in Example 1, and 10 mass parts of an oil-soluble dye, Oil Blue N (trade name, Aldrich Co.) together. Thereto 400 mass parts of distilled water was added to change the solution to be aqueous. The pH of the aqueous solution was adjusted to 11.9 to obtain an ink. Similarly, an ink of pH 7.2 was prepared with the block polymer (6) and a yellow oil-soluble dye (VALI FAST YELLOW 3108, Orient Chemical Co.). With the inks, recording was conducted to form an alternate pattern with intervals of 1 mm on a plain paper sheet. Little blur was observed at the boundary between the different colored regions. By observation by microscopy, the average breadth of the blur was found to be 0.11 mm.

Immediately after the printing, about 50 cm² area of the printed sheet was wetted with 10 mL of distilled water. However, color diffusion was not observed at all.

The 2-ethoxyethyl vinyl ether polymer, which is the A-component of the block copolymer (7), changes the property from hydrophobic to hydrophilic below 20° C. In other words, it is amphiphilic at a temperature of 20° C. or higher, forming micelles, but the micelles collapse by cooling below 20° C. When this ink composition was cooled to 0° C. to collapse the micelles, the colorant was released and floated up in the upper portion of the ink and the water phase became colorless. This means that the colorant was completely enclosed in the block copolymer micelles. The ratio of the colorant concentration in the composition to that in the above micelle-destroyed colorless aqueous phase was measured by $\lambda_{max}$. The concentration in the latter was 0.5% or less: 99% or more of the colorant was enclosed.

Example 3

In 70 mass parts of dimethylformamide, were dissolved 26 mass parts of the block copolymer (6), and 10 mass parts of an oil-soluble dye, Oil Blue N (trade name, Aldrich Co.) together. Thereto 400 mass parts of distilled water was added to change the solution to be aqueous. The pH of the aqueous solution was adjusted to 10.1 to obtain an ink. Similarly, an ink of pH 7.2 was prepared with the block polymer (7) and a yellow oil-soluble dye (VALI FAST YELLOW 3108, Orient Chemical Co.). With the inks, recording was conducted to form an alternate pattern with intervals of 1 mm on a plain paper sheet in a similar manner as in Example 1. Little blur was observed at the boundary between the different colored regions. By observation by microscopy, the average breadth of the blurring was found to be 0.10 mm.

Immediately after the printing, about 50 cm² area of the printed sheet was wetted with 10 mL of distilled water. The fixation of the inks was excellent and color diffusion was not observed at all.

The 2-ethoxyethyl vinyl ether polymer, which is the A-component of the block copolymer (7), changes the property from hydrophobic to hydrophilic below 20° C. to cause collapse of the micelles. When this ink composition was cooled to 0° C. to collapse the micelles, the colorant was released and floated up in the upper portion of the ink and the water phase became colorless. This means that the colorant was completely enclosed in the block copolymer micelles. The ratio of the colorant concentration in the composition to that in the above micelle-destroyed colorless aqueous phase was measured by $\lambda_{max}$. The concentration in the latter was 0.5% or less: 99% or more of the colorant was enclosed.

Example 4

In 150 mass parts of dimethylformamide, were mixed 15 mass parts of the block polymer (3), and 7 mass parts of a black pigment (trade name: MOGUL-L, Cabot Co.) together. Thereto 500 mass parts of distilled water was added to change the solution to be aqueous. The pH of the aqueous solution was adjusted to 10.4 with an aqueous KOH solution to obtain an ink composition.

In a mixture of 250 mass parts of THF and 80 mass parts of ethylene glycol, were dissolved 15 mass parts of the block polymer (4) and 7 mass parts of C.I. Pigment Blue 15:3 together. Thereto 500 mass parts of distilled water was added to change the solution to be aqueous. The THF was distilled off under a reduced pressure. The pH was adjusted to 6.3 to obtain another ink composition.

Recording was conducted in a similar manner as in Example 1 to print an alternate pattern with intervals of 1 mm on a plain paper sheet. Little blur was observed at the boundary between the different colored regions. By observation by microscopy, the average breadth of the blurring was found to be 0.06 mm.

Immediately after the printing, about 50 cm$^2$ area of the printed sheet was wetted with 10 mL of distilled water. However, color diffusion was not observed at all.

The liquid compositions were frozen to solidify the water by means of TEM (Cryotransfer, FEI Co.), and were examined by electron microscopy. Only spherical micelle particles were observed. This showed that the colorant was completely enclosed by the block polymer.

Example 5

A portion of 15 mass parts of the block polymer (3), and 7 mass parts of an oil-soluble yellow dye used in the previous Example were mixed in 150 mass parts of dimethylformamide. Thereto 500 mass parts of distilled water was added to change the solution to be aqueous. The pH of the aqueous solution was adjusted to 10.4 with an aqueous KOH solution to obtain an ink composition.

In a mixture of 250 mass parts of THF and 80 mass parts of ethylene glycol, were dissolved 15 mass parts of the block polymer (5) and 7 mass parts of C.I. Pigment Blue 15:3 together. Thereto 500 mass parts of distilled water was added to change the solution to be aqueous. The THF was distilled off under a reduced pressure. The pH was adjusted to 2.0 to obtain another ink composition.

Recording was conducted in a similar manner as in Example 1 to form an alternate pattern with intervals of 1 mm on a plain paper sheet. Little blur was observed at the boundary between the blue-colored region and the yellow-colored region. By observation by microscopy, the average breadth of the blur was found to be 0.05 mm.

Immediately after the printing, about 50 cm$^2$ area of the printed sheet was wetted with 10 mL of distilled water. However, color diffusion was not observed at all.

The liquid compositions were frozen to solidify the water by means of TEM (Cryotransfer, FEI Co.), and were examined by electron microscopy. Only spherical micelle particles were observed. This showed that the colorant was completely enclosed by the block polymer.

Portions of 0.3 mL of the above two inks were mixed in a vial. Thereby the mixture became viscous obviously. Specifically, the former ink had a viscosity of 4.8 cps, and the latter ink had a viscosity of 4.5 cps, and the mixture had a viscosity of 28.7 cps (The viscosity was measured by DAR-100, Rheologica Co.).

Comparative Example 2

A dye ink composition was prepared from 1.5 mass parts of sodium azulenesulfonate (a water-soluble blue dye), 10 mass parts of ethylene glycol, 10 mass parts of diethylene glycol, and 78.5 mass parts of distilled water. The pH of the composition was adjusted to 5.1.

A portion of 26 mass parts of the block copolymer (6) and 10 mass parts of a yellow oil-soluble dye (VALI FAST YELLOW 3108, Orient Chemical Co.) were dissolved together in dimethylformamide. To the solution, 400 mass parts of distilled water to change the solution to be aqueous. The pH was adjusted to 10.1 to obtain an ink.

Recording was conducted in a similar manner as in Example 1 to form an alternate pattern with intervals of 1 mm on a plain paper sheet. Blurring was observed visually. By observation by microscopy, the average breadth of the blur was found to be 0.20 mm.

Immediately after the printing, about 50 cm$^2$ area of the printed sheet was wetted with 10 mL of distilled water. Diffusion and mixing of the colors were simultaneously caused remarkably, resulting in significant disorder of the recorded pattern.

Comparative Example 3

To 178 mass parts of deionized water, were added 3 mass parts of a magenta pigment (C.I. Pigment Red 122), 5 mass parts of a styrene/sodium acrylate block copolymer (1:1 copolymer, number-average molecular weight: 6,300, weight-average molecular weight: 9,200), and 15 mass parts of ethylene glycol. The pH of the mixture was adjusted to 9.7. The mixture was dispersed by an ultrasonic homogenizer. The homogenized mixture was filtered through a 1-μm filter by application of pressure to obtain an aqueous pigment dispersion ink. The dispersion state was excellent.

To 178 mass parts of deionized water, were added 3 mass parts of a black pigment (trade name: MOGUL-L, Cabot Co.), 5 mass parts of a sodium styrenesulfonate/styrene random copolymer (1:2 copolymer, number-average molecular weight: 4,500, weight-average molecular weight: 7,900), and 15 mass parts of ethylene glycol. The pH of the mixture was adjusted to 6.1. The mixture was dispersed by an ultrasonic homogenizer. The homogenized mixture was filtered through a 1-μm filter by application of pressure to obtain an aqueous pigment dispersion ink. The dispersion state was excellent.

Recording was conducted in a similar manner as in Example 1 to form an alternate pattern with intervals of 1 mm on a plain paper sheet. Blurring was observed visually. By observation by microscopy, the average breadth of the blur was found to be 0.17 mm.

Immediately after the printing, about 50 cm$^2$ area of the printed sheet was wetted with 10 mL of distilled water. Diffusion and mixing of the colors were simultaneously caused remarkably, resulting in significant disorder of the recorded pattern.

Example 6

A mixture of 7 mass parts of a styrene/sodium acrylate block polymer (1:1 copolymer, number-average molecular weight: 6,300, weight-average molecular weight: 9,200), 7 mass parts of a black pigment (trade name: MOGUL-L, Cabot Co.), 40 mass parts of ethylene glycol, and 200 mass parts of distilled water was homogenized by means of an ultrasonic homogenizer. The homogenized mixture was filtered through a 1-μm filter by application of pressure, and the pH was adjusted to 9.3 to obtain an aqueous pigment dispersion ink.

A dye ink composition was prepared from 1.5 mass parts of sodium azulenesulfonate (a water-soluble blue dye), 10 mass parts of ethylene glycol, 10 mass parts of diethylene glycol, 3 mass parts of the block polymer (1), and 77.5 mass parts of distilled water. The pH of the composition was adjusted to 7.3.

An alternate pattern was printed with intervals of 1 mm on a plain paper sheet in a similar manner as in Example 1. The average breadth of the blur at the boundary of the different colored regions was found to be 0.12 mm by observation by microscopy.

Immediately after the printing, about 50 cm$^2$ area of the printed sheet was wetted with 10 mL of distilled water. As the result, diffusion and mixing of the colors were little.

The liquid compositions were frozen to solidify the water by means of TEM (Cryotransfer, FEI Co.), and were examined by electron microscopy. About 60% of the pigment particles were bared, being not enclosed.

Example 7

In 150 mass parts of dimethylformamide, were mixed 15 mass parts of the block polymer (3), and 7 mass parts of a black pigment (trade name: MOGUL-L, Cabot Co.) together. Thereto 500 mass parts of distilled water was added to change the solution to be aqueous. The pH of the aqueous mixture was adjusted to 10.4 with an aqueous KOH solution to obtain an ink composition.

A dye ink composition was prepared from 1.5 mass parts of sodium azulenesulfonate (a water-soluble blue dye), 10 mass parts of ethylene glycol, 10 mass parts of diethylene glycol, 3 mass parts of the block polymer (4), and 77.5 mass parts of distilled water. The pH of the composition was adjusted to 6.8.

An alternate pattern was printed with intervals of 1 mm on a plain paper sheet in a similar manner as in Example 1. The average breadth of the blur at the boundary between the different colored regions was found to be 0.11 mm by observation by microscopy.

Immediately after the printing, about 50 cm$^2$ area of the printed sheet was wetted with 10 mL of distilled water. However, neither color diffusion nor color mixing was observed.

The liquid compositions were frozen to solidify the water by means of TEM (Cryotransfer, FEI Co.), and were examined by electron microscopy. Only spherical micelle particles were observed. This showed that the colorant was completely enclosed by the block polymer.

Example 8

A portion of 15 mass parts of the block polymer (3), and 7 mass parts of C.I. Pigment Blue-15:3 were mixed in 150 mass parts of dimethylformamide. Thereto 500 mass parts of distilled water was added to change the solution to be aqueous. The pH of the aqueous solution was adjusted to 10.4 with an aqueous KOH solution to obtain an ink composition.

In a mixture of 250 mass parts of THF and 80 mass parts of ethylene glycol, were dissolved 15 mass parts of the block polymer (5) and 11 mass parts of C.I. Pigment yellow 128 together. Thereto 500 mass parts of distilled water was added to change the solution to be aqueous. The THF was distilled off under a reduced pressure. The pH was adjusted to 3.7 to obtain another ink composition.

An alternate pattern was printed with intervals of 1 mm on a plain paper sheet in a similar manner as in Example 1. Blurring between the blue region and the yellow region was little. The average breadth of the blur was found to be 0.08 mm by observation by microscopy.

Immediately after the printing, about 50 cm$^2$ area of the printed sheet was wetted with 10 mL of distilled water. However, diffusion was not observed at all.

The liquid compositions were frozen to solidify the water by means of TEM (Cryotransfer, FEI Co.), and were examined by electron microscopy. Only spherical micelle particles were observed. This showed that the colorant was completely enclosed by the block polymer.

Example 9

A portion of 15 mass parts of the block polymer (3), and 7 mass parts of a black pigment (MOGUL-L, Cabot Co.) were mixed in 150 mass parts of dimethylformamide. Thereto 500 mass parts of distilled water was added to change the solution to be aqueous similarly as in the above Examples. The pH of the aqueous mixture was adjusted to 10.4 with an aqueous KOH solution to obtain an ink composition.

In a mixture of 250 mass parts of THF and 80 mass parts of ethylene glycol, were dissolved 15 mass parts of the block polymer (5) and 10 mass parts of C.I. Pigment Red 122 together. Thereto 500 mass parts of distilled water was added to change the solution to be aqueous. The THF was distilled off under a reduced pressure. The pH was adjusted to 3.7 to obtain another ink composition.

An alternate pattern was printed with intervals of 1 mm on a plain paper sheet in a similar manner as in Example 1. Blurring between the black region and the red region was little. The average breadth of the blur was found to be 0.09 mm by observation by microscopy.

Immediately after the printing, about 50 cm$^2$ area of the printed sheet was wetted with 10 mL of distilled water. However, diffusion was not observed at all.

The liquid compositions were frozen to solidify the water by means of TEM (Cryotransfer, FEI Co.), and were examined by electron microscopy. Only spherical micelle particles were observed. This showed that the colorant was completely enclosed by the block polymer.

Another test was conducted in the same manner as above except that the pigment to be dispersed by the polymer (5) was changed to C.I. Pigment Yellow 128. Little blurring was found at the boundary between the black region and the yellow region. The average breadth of the blurring was found to be 0.09 mm by observation by microscopy.

As shown in Examples 7, 8 and 9, preferred in the present invention are combinations of an ink composition of a dark color type such as black and cyan employing a carboxylic acid-containing polymer and another ink composition of a relatively pale color type such as magenta and yellow employing a sulfonic acid-containing polymer.

Further, a similar test was conducted by using the lithium salt type of the block polymer (5) in place of the sodium type thereof for dispersing the above C.I. Pigment Yellow 128. As the result, little blurring was observed at the boundary between the black region and the yellow region. The breadth of the blurring was found to be 0.08 mm by observation by microscopy.

The invention claimed is:

1. A method comprising:
   a step of applying to a recording medium a liquid consisting of a first liquid composition and a second liquid composition, each of the liquid compositions comprising:
   a functional substance;
   an amphiphilic block copolymer; and
   a liquid medium, with a pH and a pKa of an organic acid group or a salt of the organic acid group of the copolymer of the first liquid composition being different than a pH and a pKa of an organic acid group or a salt of the organic acid group of the copolymer of the second liquid composition,
   wherein (i) the first liquid composition is greater than the second liquid composition in pH of the liquid compositions, (ii) the first liquid composition is greater than the second liquid composition in pKa of the organic acid group or the salt of the organic acid group of the copolymers, (iii) the organic acid of the copolymer of the second liquid composition is a sulfonic acid, and (iv) an increase in viscosity of the first liquid composition is caused by a decrease in pH of the first liquid composition on contact with the second liquid composition, and
wherein the copolymer of the second liquid composition has a repeating unit structure represented by the following formula:

$$-(CH_2-CH)- \\ \phantom{xxxxx} | \\ \phantom{xxxxx} OR^{50}$$
General formula (5)

where in $OR^{50}$ is represented by any formula selected from the group consisting of the following:

$OCH_2CH_2OPhSO_3H$ $OCH_2CH_2OPhSO_3^-M$ $OCH_2CH_2PhSO_3H$ $OCH_2CH_2PhSO_3^-M$ $OCH_2CH_2OPhPhSO_3^-M$ $OCH_2CH_2ONpSO_3^-M$ $OCH_2CH_2CH_2OPhSO_3H$ $OCH_2CH_2Ph(CH_3)SO_3^-M$ $OCH_2CH_2CH_2CH_2PhSO_3-M$ $OCH_2CH_2CH_2OPhSO_3^-M$ $OCH_2CH(CH_3)OPhSO_3^-M$ $OCH_2CH(CH_2H_5)OPhSO_3H$ $OCH_2CH(C_3H_7)OPhSO_3^-M$ $O(CH_2CH_2O)_2PhSO_3H$ $OCH_2CH_2O(CH_2CH_2CH_2O)_2PhSO_3H$ $OCH_2CH_2PyPhSO_3^-M$ $OCH_2CH_2OPyPhSO_3^-M$ $O(CH_2CH_2O)_2(CH_2)_2PhSO_3H$ $O(CH_2CH_2O)_3(CH_2)_2PhSO_3^-M$ $O(CH_2CH_2O)_{20}PhSO_3H$ $O(CH_2CH_2O)_2(CH_2)_6OphSO_3^-M$ $O(CH2CH_2O)_6(CH_2)_8)OphSO_3H$ $O(CH_2CH_2O)_{10}(CH_2)_{10}OphSO_3^-M$ $O(CH_2CH_2O)_2(CH_2)_{20}OphSO_3H$ $OCH_2CH_2CH_2CH_2CH_2CH_2CH_2CH_2O(CH_2)_2OPhSO^-M$ $OCH_2CH_2CH_2CH_2O(CH_2)_4OPhSO_3H$ $OCH_2CH_2CH_2CH_2CH_2CH_2CH_2CH_2O(CH_2)_5OphSO_3^-M$ wherein M represents a monovalent or multivalent cation, Ph represents 1,4-phenylene or 1,3-phenylene, Py represents 2,5-pyrimidyl, and Np represents 2,6-napthylene, 1,4-napthylene, or 1,5-napthylene.

2. The method according to claim 1, wherein the difference between the pKa of the organic acid groups or the salts of the organic acid groups contained in the copolymers of the first and second compositions is 0.3 or more, and a difference between a pH of the first and second liquid compositions is 0.3 or more.

3. The method according to claim 1, wherein the difference between the pKa of the organic acid groups or the salts of the organic acid groups contained in the copolymers is at least two.

4. The method according to claim 1, wherein the pKa of the sulfonic acid of the copolymer of the second liquid composition at least two.

5. The method according to claim 1, wherein the organic acid groups of the copolymer of the first liquid composition are selected from benzoic acid groups, aliphatic dicarboxylic acid groups, aromatic dicarboxylic acid groups, halogen-substituted benzoic acid groups, and sulfonic acid groups.

6. The method according to claim 1, wherein the pKa of the sulfonic acid of the copolymer of the second liquid composition is not higher than zero.

7. The method according to claim 1, wherein the organic acid of the first liquid composition is any one selected from the group consisting of benzoic acid, halogen-substituted benzoic acids, and sulfonic acids.

8. The method according to claim 1, wherein the copolymer of the second liquid composition is a diblock polymer constituted of (a) isobutyl vinyl ether and 2-vinyloxy-1-biphenyloxyethyl (A-block component), and (b) sodium 4-(2-vinyloxyethoxy)benzenesulfonate (B-block component).

* * * * *